United States Patent
Deininger et al.

(10) Patent No.: US 8,448,065 B2
(45) Date of Patent: May 21, 2013

(54) SYSTEM AND METHOD FOR THE EDITING AND ACCESSING REAL-TIME OPC DATA WITH TEXT-BASED TAGS

(75) Inventors: Thomas A. Deininger, Ambler, PA (US); Michael S. Horn, Bath, PA (US); Alan J. Kratz, East Greenville, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 1060 days.

(21) Appl. No.: 11/758,950

(22) Filed: Jun. 6, 2007

(65) Prior Publication Data

US 2007/0299907 A1 Dec. 27, 2007

(51) Int. Cl.
*G06N 3/00* (2006.01)

(52) U.S. Cl.
USPC .......................................................... 715/255

(58) Field of Classification Search
USPC ............. 700/9, 15, 17, 18, 19; 709/217, 218, 709/219; 710/8, 9, 15, 18, 19, 17; 715/234, 715/243, 254, 255
See application file for complete search history.

(56) References Cited

U.S. PATENT DOCUMENTS

| | | | | |
|---|---|---|---|---|
| 5,038,318 | A * | 8/1991 | Roseman | 712/30 |
| 6,628,992 | B2 * | 9/2003 | Osburn, III | 700/9 |
| 7,096,465 | B1 * | 8/2006 | Dardinski et al. | 717/178 |
| 7,660,701 | B2 * | 2/2010 | Sharpe, Jr. | 702/183 |
| 7,684,875 | B2 * | 3/2010 | Jundt et al. | 700/19 |
| 2003/0014536 | A1 * | 1/2003 | Christensen et al. | 709/238 |
| 2004/0199925 | A1 * | 10/2004 | Nixon et al. | 719/315 |
| 2006/0218266 | A1 * | 9/2006 | Matsumoto et al. | 709/224 |
| 2006/0241913 | A1 * | 10/2006 | De Groot et al. | 702/188 |
| 2007/0250180 | A1 * | 10/2007 | Bump et al. | 700/1 |

FOREIGN PATENT DOCUMENTS

| | | |
|---|---|---|
| WO | WO 02/10919 A2 | 2/2002 |
| WO | WO 02/31607 A2 | 4/2002 |
| WO | WO 03/032233 A1 | 4/2003 |

OTHER PUBLICATIONS

Kepware Technologies, "Connectivity Guide",KepserverEx Client,2001 ,pp. 1-129, XP002468399, Maine,USA.
Iconics Inc., "Moeller OPC Server", Iconics OPC Servers, 2001, pp. 1-1-3-6, XP002468400, Foxborough, MA,02035,USA.
Bela G. Liptak, "Process Software and Digital Networks", Instrument Engineers' Handbook, 2002, pp. 708-713,XP008088436, USA.
Point Six Inc., "Users Guide", OneSix OPC Server, 2004, pp. 1-54, XP002468401, Lexington, KY 40517, USA.

* cited by examiner

*Primary Examiner* — Stephen Hong

(57) ABSTRACT

Systems and methods for object linking and embedding for process control networks are disclosed. The exemplary system may include one or more field devices. The system may also include a process control server for monitoring the field devices, storing field information and one or more parameters for each of the field devices, and associating each of the field devices input/output data with a text-based tag. The system may also include a client computer capable of accessing the one or more parameters of each field device by identifying the field information containing the desired text-based tags. The data may be displayed in real time.

18 Claims, 4 Drawing Sheets

FIG. 4

| Tag Name | Value |
|---|---|
| LOOP1.PV | 33.3 |
| LOOP1.SP | 33.3 |
| LOOP1.OUT | 100 |
| LOOP1.GAIN | 0.2 |
| LOOP1.BIAS | 0.2 |
| LOOP1.P1 | 100 |
| LOOP1.P2 | 120 |
| LOOP1.HI LIMIT | 100 |
| LOOP1.LO LIMIT | 0 |
| LOOP1... etc. | |

SYSTEM AND METHOD FOR THE EDITING AND ACCESSING REAL-TIME OPC DATA WITH TEXT-BASED TAGS

CROSS REFERENCE TO RELATED APPLICATIONS

This application claims priority to U.S. Provisional Patent Application No. 60/811,554 filed Jun. 7, 2006 entitled "OPC TAG EDITOR", which is incorporated fully herein by reference.

FIELD OF THE INVENTION

The present invention relates generally to a tag editor system, and more particularly to a tag editor system for object linking and embedding for process control networks.

BACKGROUND OF THE INVENTION

In the process automation industry, object linking and embedding for process control (OPC) provides a standard for communicating with field devices. This standard allows for accessing process data, alarms, events, and historical process data. In a typical monitoring and control network, one or more servers are equipped with the OPC Server application which receives field device data and stores the data in volatile memory. This data is constantly being updated through polling functions initiated by the process control server or by a predetermined reporting cycle that the field devices follow to report the status of the I/Os (Inputs/Outputs) and field devices. The addressing information needed to access the field devices is stored in the process control server's tag database. The server tag database encapsulates the physical field device addressing into a simple text-based tag that is accessible by any clients with access to the network. The server tag database is specific to the types of field devices used in an application. This database requires considerable configuration efforts.

A client computer 108 is typically equipped with a Human Machine Interface (HMI) application that is used to visualize and interact with the field devices using symbolic images and standard windows widgets (e.g. listbox, textbox, radio button, checkbox). The HMI contains programs/drivers capable of communicating with any process control server accessible locally on the same computer or from the network. The HMI application's tag database is configured with the process control server tags that are referenced on the graphic pages. The process control server reports changes in the tag values to the HMI application, which then updates the appropriate graphical element. The HMI tag database is specific to the HMI and its graphics. This database also requires considerable configuration efforts.

One common method of displaying real-time server tag information on an HMI graphic consists of first adding a tag to the HMI tag database that references the process control server tag. Then a display element is added to the graphic (e.g. Textbox). Finally, the real-time display of that element is associated with the appropriate HMI tag database tag. The effort required to configure an HMI display and edit a large server tag database is considerable and error prone. Accordingly, an efficient device and method are needed for displaying and editing real-time server tag data without requiring the explicit configuration of the HMI tag database.

SUMMARY OF THE INVENTION

It is, therefore, an object of the present invention to provide systems and methods for accessing object linking and embedding for process control data. It is another object of the present invention to provide real-time access to the data and to achieve this without requiring the explicit configuration of the Human Machine Interface (HMI) tag database.

In an exemplary embodiment, a tag editor may operate on a client computer with a process control server monitoring the field devices, storing physical addressing information and/or one or more parameters for each of the field devices, and associating each of the field devices with a text based tag. The client computer may access the one or more parameters of each field device by identifying the text based tag. In an exemplary embodiment, the tag editor may provide access to the text-based tags in a system after configuration of a name of the process control server and a name of at least one PID (Proportional, Integral, Derivative) loop, analog inputs, discrete inputs, analog outputs, discrete outputs, counters, or other parameters of the field device containing the tags. In a preferred embodiment, the tag editor displays the real-time data in a user-friendly, readable format.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 4 is an exemplary display containing text-based tags and the corresponding parameters.

Figure 1:
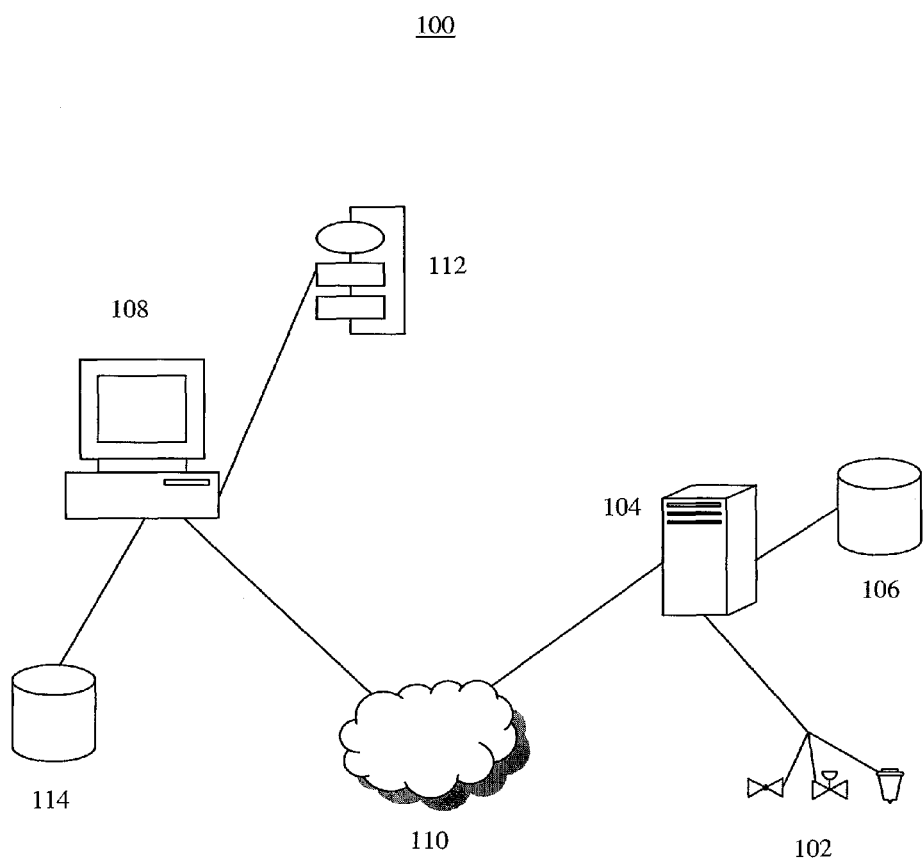
FIG. 1 is a generalized schematic of a first exemplary embodiment of the present invention.

Shown in FIG. 1 is an example of a monitoring and control network. A Server PC is equipped with the OPC server application which takes field device data and stores the data in volatile memory. This data is constantly being updated through polling functions initiated by the OPC server or by a predetermined reporting cycle which the filed devices follow to report the status of the I/O and field devices. The addressing information needed to access the field devices is stored in the OPC Server's tag database. The OPC Server tag database encapsulates the physical field device addressing into a simple text-based tag which is accessible by OPC clients. For example, the OPC server's tag database may define the text-based tag LOOP 1.PV to represent the value of the field device's I/O value addresssable as buffer page 0x54, memory offset 0x1098. Clients of the OPC Server do not have to be concerned with the physical addressing of the field devices. The OPC Server tag database is specific to the types of field devices and requires considerable configuration efforts.

A client PC is equipped with a HMI (Human Machine Interface) application which is used to visualize and interact with the field devices using symbolic images and standard windows widgets (e.g. listbox, textbox, radio button, checkbox). The HMI contains programs/drivers capable of communicating with any OPC server accessible locally on the same computer or from the network. The HMI application's tag database is configured with the OPC Server tags that are referenced on the graphic pages, The OPC Server reports changes in the tag values to the HMI application, which then updates the appropriate graphical element. The HMI tag database is specific to the HMI and its graphics and requires considerable configuration efforts.

As done by common practice, real-time OPC Server tag information is displayed on a HMI graphic by: first adding a tag to the HMI tag database that references the OPC Server tag; and second adding a display element to a graphic (e.g. Textbox) and associating the real-time display of that element to the appropriate HIMI tag database tag. Other graphic widgets are added to provide convenient user input interfaces such as limited checked input boxes, sliders, etc. The effort required to configure a HMI to display and edit a large OPC Server tag database is considerable and error prone.

HMI applications commonly allow for some graphical "plug-in" capability using any standard or proprietary technology (e.g. ActiveX, Java Bean). These "plug-in" features allow for the execution and interaction with third-party binary extensions to the graphics display.

This invention proposes the introduction of a graphics binary extension to the display and edit real-time OPC tag data without requiring the explicit configuration of the HMI tag database. Given only the name of the OPC Server and some wildcard set of tag names, the OPC tag editor can properly display and allow edits to any OPC Server data, The OPC tag editor has built-in communication capabilities to communicate directly with any OPC Server. The OPC tag editor can display the real-time data in various formats including but not limited to a textbox, grid/table, graphical chart, or free-form HTML which may include any "HTML plug-in" such as flash, SVG and VML.

DETAILED DESCRIPTION OF THE INVENTION

Referring to FIG. 1, an exemplary tag editor system 100 is shown. This type of design is frequently used in the process automation industry. One or more input/output (I/O) devices and/or field devices 102 may be used to measure or calculate various parameters related to a process. The I/Os and field devices 102 may be connected to a process control server 104. The process control server 104 may be equipped with the object linking and embedding for process control (OPC) server application which collects field device data and stores the data in volatile memory. This data is continuously being updated through polling functions initiated by the process control server 104 or by a predetermined reporting cycle that the I/Os and field devices 102 follow to report the status of the I/Os and field devices 102. The addressing information needed to access the I/Os and field devices 102 is stored in a server's tag database 106.

The server's tag database 106 encapsulates the physical field device addressing into a text-based tag that is accessible by any client computers 108 with access through a network 110 connected to the process control server 104. The network 110 may connect to one process control server 104 (as shown in FIG. 1) or it may connect to multiple servers. Multiple servers may be used to control separate processes either at the same location or at various separate locations. The network 110 may allow access to any of its connected servers. There may also be more than one client computer 108 connected to the network 110. An exemplary process control server 104 may associate each field device's input/output data with a text-based tag. For example, the server tag database 106 may have the text-based tag "LOOP1.PV" associated with the value of the field device's I/O value addressable as buffer page 0x54, memory offset 0x1098. An exemplary embodiment of the tag editor system may allow this text-based tag and its value to be accessed from the client computer 108 with minimal configuration efforts.

According to an exemplary embodiment of a tag editor system, a client computer 108 may contain a tag editor extension. The tag editor may have built-in communication capabilities to communicate directly with any process control server 104 in the network. The tag editor may allow a client computer 108 to access the server's tag database 106 after configuring the name of the process control server 104 (to identify the desired server if multiple servers are in use) and field information, for example, the PID (Proportional, Integral, Derivative) loops, analog inputs, discrete inputs, analog outputs, discrete outputs, counters, or other parameters of the field device containing the desired tags. The use of PID loops is common in process control. It is a continuous feedback loop used to monitor the value of a process variable (e.g. voltage, temperature, rate of flow). If the value of the process variable deviates from the "setpoint", then corrective action is computed by a PID controller from a computation based on the error (proportional), the sum of all previous errors (integral), and the rate of change of the error (derivative). So, in an exemplary embodiment, once the process control server 104 receives the PID loop name(s), the field device I/O data is returned to the client computer 108. The data may then be displayed through a client application 112 on a client computer 108. An exemplary embodiment of the tag editor system may allow for real-time field device I/O data to be displayed on the client computer 108. An exemplary embodiment of the tag editor system may also allow edits to any tag data stored in the server's tag database 106.

In an exemplary embodiment of the tag editor system, the client computer 108 may be equipped with a Human Machine Interface (HMI) application 112. The HMI application may be used to visualize and interact with the field devices 102 using symbolic images and standard windows widgets (e.g. listbox, textbox, radio button, checkbox). The HMI application 112 may contain program/drivers capable of communicating with any process control server 104 accessible locally on the same computer or from the network 110. An exemplary embodiment of the tag editor system may allow for the HMI tag database 114 to be eliminated from the system entirely.

Figure 2:
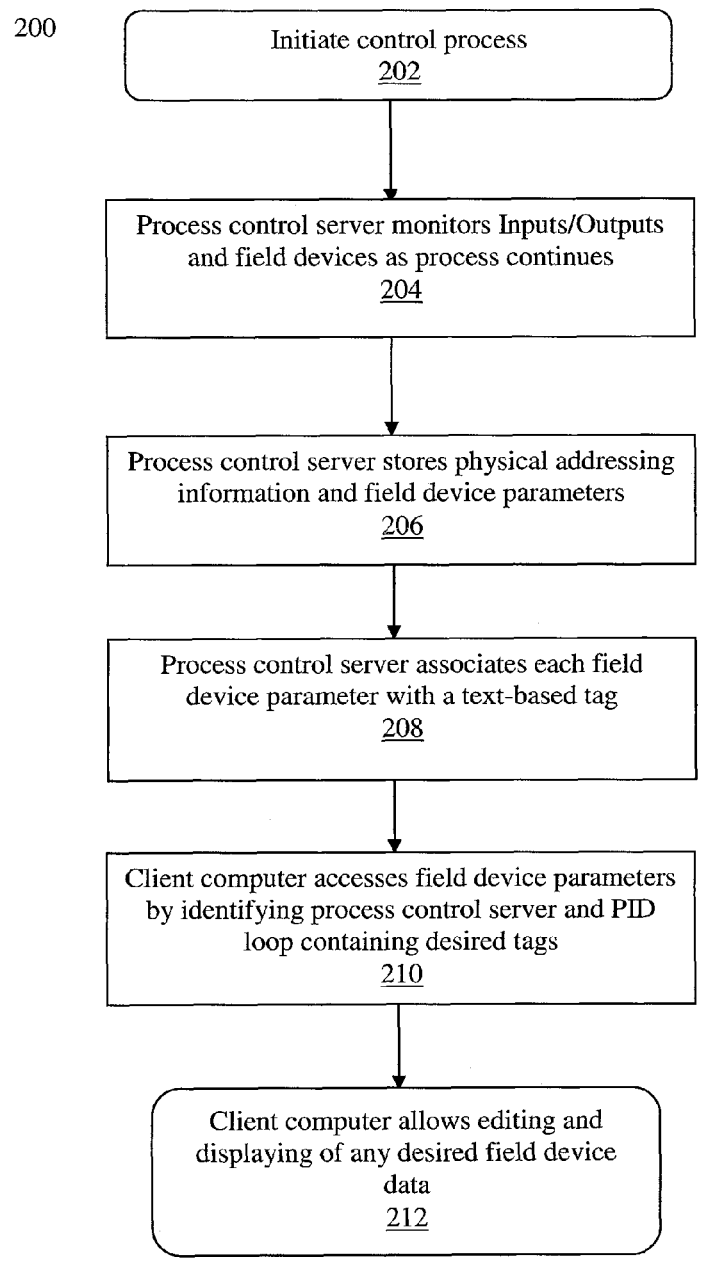
FIG. 2 is a flow chart illustrating an exemplary embodiment of the present invention.

Referring to FIG. 2, a flowchart illustrates an exemplary method for displaying and editing tag data for object linking and embedding for process control. The control process is initiated (block 202). The process control server 104 monitors the inputs/outputs and field devices 102 as the process continues (block 204). The data from the field devices is stored in the process control server's volatile memory. This data is continuously updated through polling functions initiated by the process control server 104 or by a predetermined reporting cycle that the field devices follow to report the status of the inputs/outputs and field devices 102. The process control server 104 stores the physical addressing information and field device parameters in the server's tag database 106 (block 206). The server's tag database 106 encapsulates the physical field device addressing into a simple text-based tag that may be accessed by any client computer 108 with the tag editor system. The process control server 104 also associates each field device input/output data with a text-based tag (block 208).

An exemplary embodiment of the tag editor system allows a client computer 108 to access any field device parameters involved in the process (block 210). The client computer 108 identifies the process control server (if more than one is in the network) and the name of the PID loop containing the desired text-based tag(s). An exemplary embodiment of the tag editor system enables the client computer 108 to allow editing and displaying of any desired field device data involved with the process (block 212). Real-time data may be displayed on the client computer 108 without explicitly configuring the HMI tag database 114.

Figure 3:
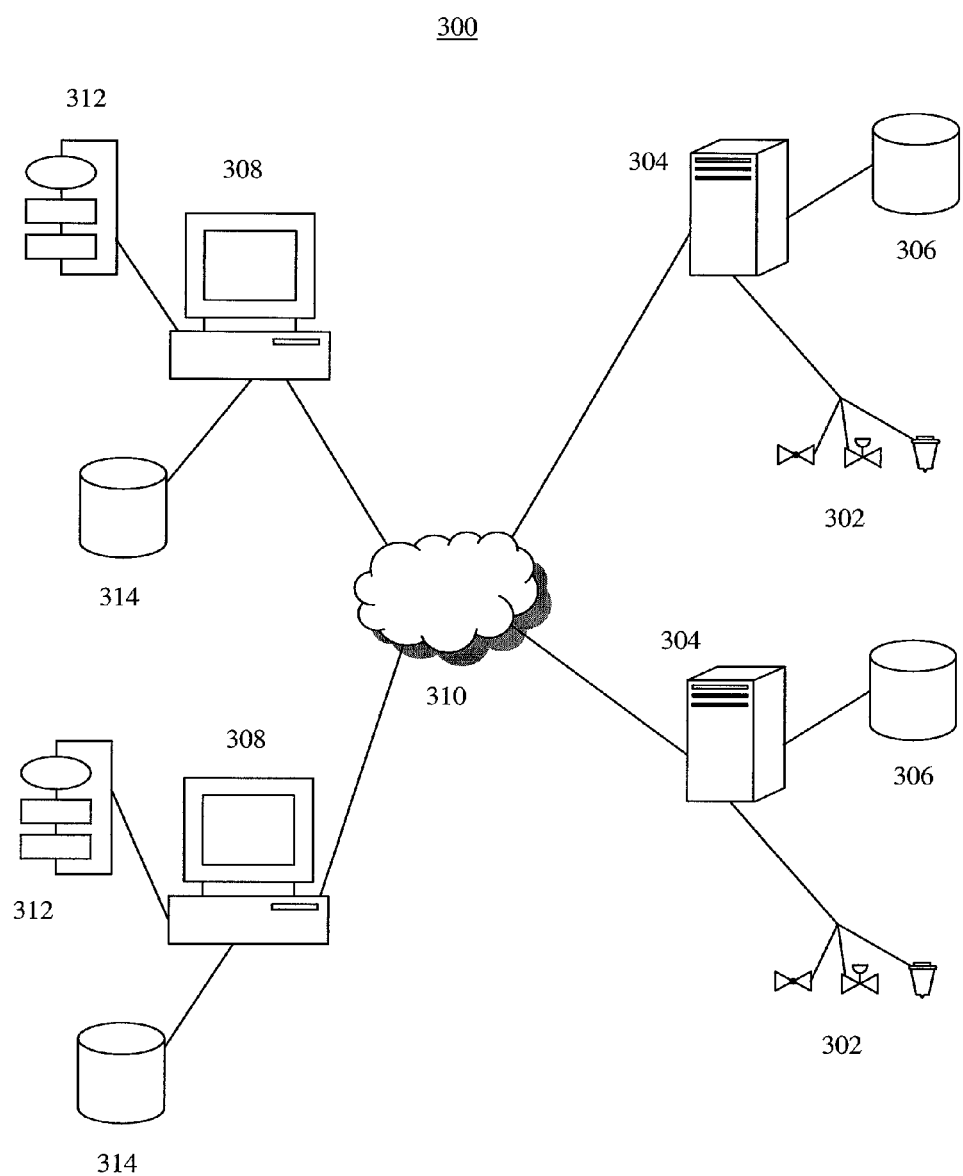
FIG. 3 is a generalized schematic of a second exemplary embodiment of the present invention.

Referring to FIG. 3, a second exemplary tag editor system 300 is shown. This system is similar to the system shown in FIG. 1, however there are multiple process control servers 304 (similar to previously mentioned 102) connected to the network 310 (similar to previously mentioned 110), and there are multiple client computers 308 (similar to previously mentioned 108) with access to the network 310 (similar to previously mentioned 110). Multiple processes are being monitored and controlled, and multiple users have access to each of these processes. In this exemplary embodiment, a client computer 308 may be required to identify a specific process control server 304 by name when accessing tag data. Each client computer may be equipped with a tag editor that has built-in communication capabilities to communicate directly with any of the process control servers 304 in the network. An exemplary embodiment of the tag editor system may allow for an HMI tag database 314 (similar to previously mentioned 114) to be eliminated from the system entirely or minimize updating or use of the HMI tag database 314.

Referring to FIG. 4, an exemplary display containing text-based tags and data from a sample PID loop is shown. A PID loop object in a distributed control system (DCS) may contain 30 or more "tags". A table, such as the one in FIG. 4, may be a desirable method of displaying all of the text-based tags along with the current parameter values updating in real time. Alternately, spreadsheets may be used along with graphic and text editors to create a graphic display of any input/output or field device parameter being monitored. All of the PID loop tags may be accessible through the tag editor by having the client computer configure the name of the process control server and the name of the PID loop.

It will be understood that the foregoing is only illustrative of the principles of the invention and that various modifications can be made by those skilled in the art without departing from the scope and spirit of the invention. Accordingly, such embodiments will be recognized as within the scope of the present invention.

Persons skilled in the art will also appreciate that the present invention can be practiced by other than the described embodiments, which are presented for purposes of illustration rather than of limitation and that the present invention is limited only by the claims that follow.

What is claimed is:

1. A tag editor system for object linking and embedding for process control network comprising:
    a plurality of field devices, each field device generating input/output data and associated with a physical address and a text-based tag;
    a process control server configured to monitor the plurality of field devices and to store the physical address and the text-based tag associated with each of the plurality of field devices, the process control server further configured to associate plurality of field devices with a PID loop and to associate the PID loop with a name;
    a client computer configured to transmit a request to the process control server, the request comprising a request string, the client computer further configured to receive the input/output data associated with each of the plurality of field devices associated with the PID loop from the process control server in response to the process control server receiving the request string and to display the received input/output data;
    a tag database comprising data that encapsulates the physical address and the text-based tag associated with each of the plurality of field devices, the tag database accessible for editing by the client computer; and
    the request string comprising the name associated with the PID loop and independent of the text-based tag associated with each of the plurality of field devices.

2. The tag editor system of claim 1, wherein the process control server is configured to monitor the plurality of field devices in real-time.

3. The tag editor system of claim 1, wherein the process control server controls at least one of the plurality of field devices.

4. The tag editor system of claim 1, wherein an editor running on the client computer has communication capabilities to communicate directly with any process control server in the network.

5. The tag editor system of claim 4, wherein the editor provides access to the input/output data after configuration of a name of the process control server and a name associated with at least one field information loop associated with the plurality of field devices.

6. The tag editor system of claim 4, wherein the editor displays the input/output data in one of the following formats: a listbox, textbox, grid, table, graphical chart, or free form HTML.

7. The tag editor system of claim 4, wherein the editor replaces the functions of a Human Machine Interface (HMI) tag database.

8. A method for displaying and editing tag data for object linking and embedding for a process control network comprising the acts of:
    supplying input/output data through a plurality of field devices, each field device associated with a physical address and a text-based tag;
    utilizing a process control server configured to monitor the plurality of field devices, the process control server further configured to store field information and one or more parameters for each of the plurality of field devices, and to associate input/output data for each of the plurality of field devices with the associated text based tag, the process control server further configured to associate the plurality of field devices with a PID loop and to associate the PID loop with a name;
    storing data in a tag database that encapsulates the physical address and the text-based tag associated with each of the plurality of field devices, the tag database accessible for editing by the client computer; and
    utilizing the client computer configured to transmit a request to the process control server, the request comprising a request string, the client computer further configured to receive the input/output data associated with each of the plurality of field devices associated with the PID loop from the process control server in response to the process control server receiving the request string and to display the received input/output data; and
    the request string comprising the name associated with the PID loop and independent of the text-based tag associated with each of the plurality of field devices.

9. The method of claim 8, wherein the process control server is configured to monitor at least one of the plurality of field devices in real-time.

10. The method of claim 8, wherein the process control server controls one or more of the plurality of field devices.

11. The method of claim 8, wherein an editor running on the client computer has communication capabilities to communicate directly with any process control server in the network.

12. The method of claim 11, wherein the editor provides access to the text-based tags after configuration of a name of the process control server and a name of each of the plurality of field devices associated with the text-based tags.

13. The method of claim 11, wherein the editor displays the input/output data in one of the following formats: a listbox, textbox, grid, table, graphical chart, or free form HTML.

14. The method of claim 11, wherein the editor replaces the functions of a Human Machine Interface (HMI) tag database.

15. A non-transitory machine-readable medium having instructions stored thereon for causing a machine to display and edit tag data for object linking and embedding in a process control network, comprising the acts of:
   receiving input/output data through a plurality of field devices, each field device generating input/output data and associated with a physical address and a text-based tag;
   monitoring the plurality of field devices, storing the physical address and the text-based tag associated with each of the plurality of field devices, the process control server further configured to associate the plurality of field devices with a PID loop and to associate the PID loop with a name;
   storing data in a tag database that encapsulates the physical address and the text-based tag associated with each of the plurality of field devices, the tag database accessible for editing by a client computer;
   accepting a request string from the client computer, the request string comprising the name associated with the PID loop; and
   transmitting to the client computer, in response to accepting the request string, the input/output data associated with each of the plurality of field devices associated with the PID loop based on the name associated with the PID loop and independent of the text-based tag associated with each of the plurality of field devices.

16. The non-transitory machine-readable medium of claim 15, wherein an editor running on the client computer has communication capabilities to communicate directly with any process control server in the process control network.

17. The non-transitory machine-readable medium of claim 16, wherein the editor provides access to the text-based tags in a system after configuration of a name of the process control server and a name of at least one PID (Proportional, Integral, Derivative) loop containing the tags.

18. The non-transitory machine-readable medium of claim 15, wherein the process control server is configured to monitor the plurality of field devices in real-time.

* * * * *